(12) United States Patent
Uchida et al.

(10) Patent No.: US 12,470,389 B2
(45) Date of Patent: Nov. 11, 2025

(54) INFORMATION PROCESSING DEVICE AND INFORMATION PROCESSING METHOD

(71) Applicant: SONY GROUP CORPORATION, Tokyo (JP)

(72) Inventors: Atsushi Uchida, Tokyo (JP); Shinya Maruyama, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 159 days.

(21) Appl. No.: 18/251,541

(22) PCT Filed: Oct. 28, 2021

(86) PCT No.: PCT/JP2021/039765
§ 371 (c)(1),
(2) Date: May 2, 2023

(87) PCT Pub. No.: WO2022/102418
PCT Pub. Date: May 19, 2022

(65) Prior Publication Data
US 2024/0015021 A1    Jan. 11, 2024

(30) Foreign Application Priority Data
Nov. 10, 2020 (JP) .................. 2020-186955

(51) Int. Cl.
*H04L 9/32* (2006.01)
*H04L 9/00* (2022.01)

(52) U.S. Cl.
CPC ............ *H04L 9/3218* (2013.01); *H04L 9/50* (2022.05)

(58) Field of Classification Search
CPC ....... H04L 9/3218; H04L 9/50; H04L 9/0891; G06F 21/31; G06F 21/64; G09C 1/00
See application file for complete search history.

(56) References Cited

U.S. PATENT DOCUMENTS

| | | | |
|---|---|---|---|
| 2019/0036712 A1* | 1/2019 | Qiu ................. | G06Q 20/38215 |
| 2021/0044976 A1* | 2/2021 | Avetisov ............... | H04W 12/08 |

FOREIGN PATENT DOCUMENTS

| | | |
|---|---|---|
| JP | 2018-007168 A | 1/2018 |
| JP | 2020-010267 A | 1/2020 |

OTHER PUBLICATIONS

Naganuma, et al., "Auditable Zerocoin", Summary of 2017 Symposium on Cryptography and Information Security (SCIS), Jan. 24-27, 2017, pp. 01-05.

(Continued)

*Primary Examiner* — Mohammed Waliullah
(74) *Attorney, Agent, or Firm* — CHIP LAW GROUP

(57) ABSTRACT

An information processing device includes a first recording unit, a verification unit, and a second recording unit. In response to a request from an information management device that manages data, the first recording unit records information regarding a browsing right of data in a blockchain. The verification unit verifies a zero-knowledge proof for proving that a user is a valid user who has been given the browsing right on the basis of the information regarding the browsing right written in the blockchain. The second recording unit records information regarding a verification result of the proof in the blockchain.

5 Claims, 11 Drawing Sheets

(56) References Cited

OTHER PUBLICATIONS

Narayanan, et al., "Virtual Currency Textbook: How cryptocurrencies such as Bitcoin work", Section 6.5, Nikkei Business Publications, Inc, Dec. 9, 2016, pp. 276-288.
International Search Report and Written Opinion of PCT Application No. PCT/JP2021/039765, issued on Jan. 25, 2022, 08 pages of ISRWO.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/039765 filed on Oct. 28, 2021, which claims priority benefit of Japanese Patent Application No. JP 2020-186955 filed in the Japan Patent Office on Nov. 10, 2020. Each of the above-referenced applications is hereby incorporated herein by reference in its entirety.

FIELD

The present disclosure relates to an information processing device, an information processing method, and an information processing program.

BACKGROUND

Distributed ledger systems, also referred to as blockchain systems, are used for management of various types of transaction information exchanged through a network. For example, Patent Literature 1 proposes technology in which an inspection device executes inspection and tracing of transaction information (remitter, receiver, the amount, etc.) of a virtual currency recorded on a distributed ledger.

In addition, in the above-described technology, a transaction with a zero-knowledge proof (transaction information) is used in order to anonymize the transaction information. For example, "zk-snarks" and others are known as technology based on a zero-knowledge proof.

CITATION LIST

Patent Literature

Patent Literature 1: JP 2018-7168 A

SUMMARY

Technical Problem

However, in a case where transaction information to be recorded in a blockchain is anonymized by a zero-knowledge proof, there is a disadvantage that it is difficult to provide service promptly. This is because a certain length of time is required to complete the processing of a zero-knowledge proof.

Therefore, the present disclosure proposes an information processing device, an information processing method, and an information processing program capable of implementing quick service provision while ensuring anonymity.

Solution to Problem

To solve the above problem, an information processing device that provides a service that requires an identity verification process according to an embodiment of the present disclosure includes: a first recording unit that records information regarding a browsing right of data in a blockchain in response to a request from an information management device that manages the data; a verification unit that verifies a zero-knowledge proof for proving that a user is a valid user who has been given the browsing right on a basis of the information regarding the browsing right written in the blockchain; and a second recording unit that records information regarding a verification result of the proof in the blockchain.

DESCRIPTION OF EMBODIMENTS

Figure 1:
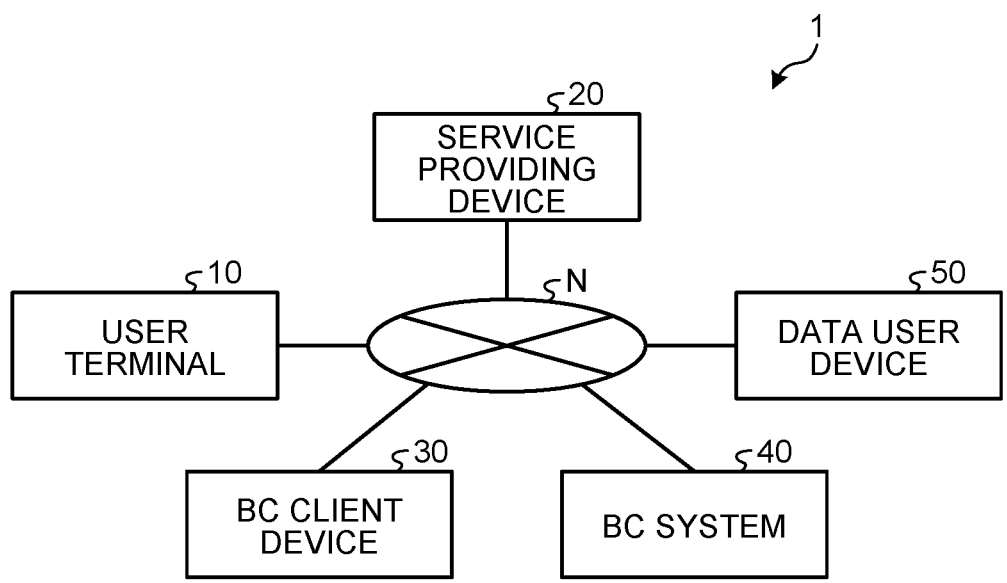
FIG. 1 is a schematic diagram illustrating a system configuration example according to an embodiment of the present disclosure.

Hereinafter, embodiments of the present disclosure will be described in detail on the basis of the drawings. Note that, in the following embodiments, there are cases where redundant description is omitted by denoting the same parts by the same numeral or symbol. Note that, in the present specification and the drawings, a plurality of components having substantially the same functional configuration may be distinguished by attaching different numerals or symbols after the same numeral or symbol.

The present disclosure will be described in the following order of items.

1. Introduction
2. System Configuration Example
3. Overview of Information Processing
4. Device Configuration Example
5. Processing Procedure Example
6. Modification
7. Others
8. Hardware Configuration Example
9. Conclusion

1. INTRODUCTION

1-1. Background

A blockchain (distributed ledger system) has a feature that a history (transaction history) of transaction information of a virtual currency and the like can be tracked through a blockchain address uniquely assigned to each piece of data recorded in the blockchain. Meanwhile, it is not realistic to erase the transaction history recorded in the blockchain, which entails a privacy problem.

In view of this privacy problem, it is also conceivable to completely anonymize the transaction information recorded in the blockchain by encrypting the transaction information. However, in a case where the transaction information is completely anonymized, the validity of the transaction history cannot be verified, and the safety of the distributed ledger is impaired. Therefore, the zero-knowledge proof (ZKP) attracts attention as a method that does not impair the verifiability of the distributed ledger while ensuring privacy.

The zero-knowledge proof is a protocol for proving that a certain matter is correct (that a proposition is true). By using the zero-knowledge proof, it is possible to prove that a party knows a piece of information without disclosing the information that the party does not want to disclose. Therefore, by recording a transaction history using a zero-knowledge proof in the blockchain, it is possible to secure privacy without impairing the verifiability of the distributed ledger.

1-2. Prior Technology

Hereinafter, a "Merkle Tree" used in "zk-snarks" will be described as an example of technology for implementing the zero-knowledge proof used for anonymization of transaction information of a virtual currency or the like.

In a virtual currency transaction, anonymity to be secured includes "anonimity" and "unlikability". "Anonimity" means that it is not known which user is conducting a transaction. "Unlikability" means that it is not possible to determine whether or not the same user is conducting two transactions. In a transaction of a virtual currency, by satisfying the above-described two types of anonymity, a monetary transaction can be performed while concealing "who and who transacted when and how much".

In order to satisfy the two types of anonymity in the distributed ledger, it is necessary not to write information identifying a user in the transaction history on the blockchain and to make it impossible to determine which record used which browsing right of whom.

Figure 12:
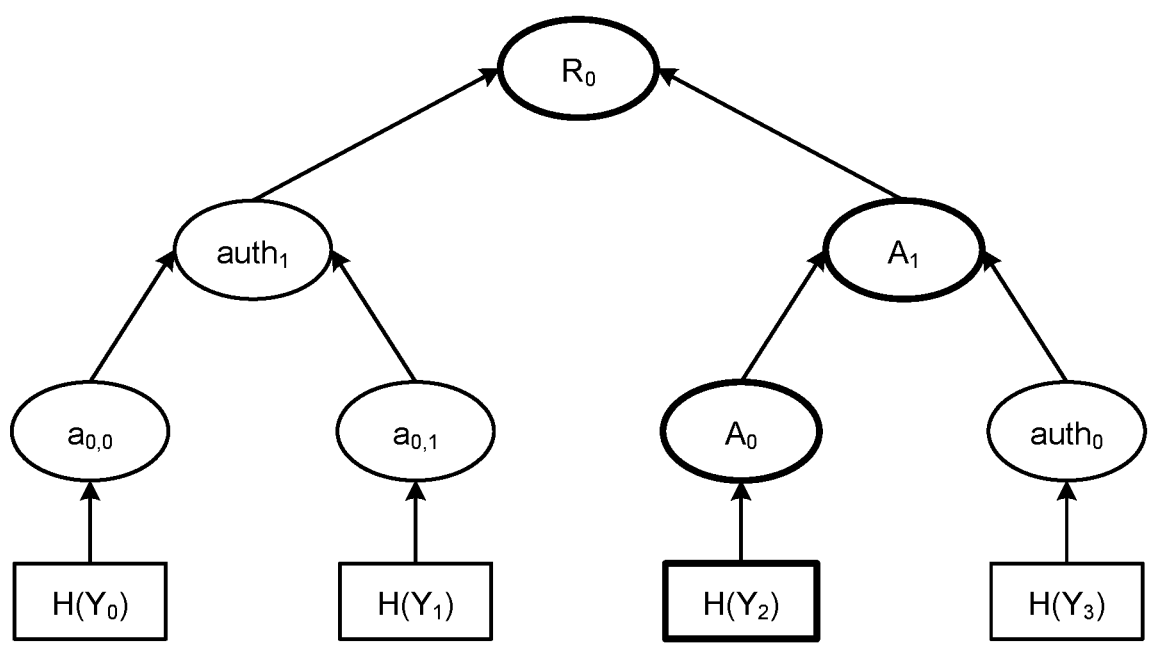
FIG. 12 is a diagram illustrating an overview of a zero-knowledge proof using a "Merkle Tree".

A "Merkle Tree" can indicate that there is a record of the user's right in all transaction histories without specifying the user's record. Therefore, by creating a zero-knowledge proof using a "Merkle Tree", the above two types of anonymity are satisfied. FIG. 12 is a diagram illustrating an overview of the zero-knowledge proof using a "Merkle Tree".

"$H(Y_0)$" to "$H(Y_3)$" in FIG. 12 indicate hash values to be written in the blockchain. "$a_{0,0}$", "$a_{0,1}$", "$A_0$", "$A_1$", "$auth_0$", "$auth_1$", and "$R_0$" in FIG. 12 each indicate a node included in the tree structure of a "Merkle Tree".

By using the "Merkle Tree", whether or not the value of the node "$R_0$" serving as the root of the tree structure created using all the hash values "$H(Y_0)$" to "$H(Y_3)$" is correctly calculated can be used as a proposition of the zero-knowledge proof. For example, "$auth_0$" and "$auth_1$" are set as secret information (values) exchanged between a verifier and a prover. As a result, only a person who can know the secret information (value) can correctly calculate the value of the node "$R_0$" serving as the root of the tree structure. In this manner, it is possible to prove that the user's hash value is included in the blockchain without disclosing information for specifying the user's own hash value to be recorded in the blockchain.

As described above, the zero-knowledge proof using the "Merkle Tree" implements high anonymity, whereas the amount of calculation for the zero-knowledge proof is large, and it may take time to verify the proposition. For example, if the number of layers until reaching the root node is large when the tree structure as illustrated in FIG. 12 is created, the amount of calculation increases accordingly. Therefore, in a case where the transaction information recorded in the blockchain is anonymized by the zero-knowledge proof, there is a problem that it is difficult to promptly provide service. This problem is particularly problematic, for example, for service in which face-to-face transaction is performed. Therefore, the present disclosure proposes an information processing device, an information processing method, and an information processing program capable of implementing quick service provision while ensuring anonymity.

2. System Configuration Example

Hereinafter, a configuration example of an information processing system according to an embodiment of the present disclosure will be explained. FIG. 1 is a schematic diagram illustrating the system configuration example according to the embodiment of the present disclosure. As illustrated in FIG. 1, an information processing system 1 according to the embodiment of the present disclosure includes a user terminal 10, a service providing device 20, a BC client device 30, a BC system 40, and a data user device 50. The configuration of the information processing system 1 is not necessarily particularly limited in the example illustrated in FIG. 1 and may include more user terminals 10, service providing devices 20, BC client devices 30, BC systems 40, or data user devices 50 than those illustrated in FIG. 1.

The user terminal 10, the service providing device 20, the BC client device 30, the BC system 40, and the data user device 50 are connected to a network N in a wired or wireless manner. The network N includes a local area network (LAN), a wide area network (WAN), a telephone network (mobile telephone networks, house telephone networks, etc.), a regional Internet protocol (IP) network, the Internet, and the like.

Furthermore, the user terminal 10 and the service providing device 20 can communicate with each other via the network N. Furthermore, the service providing device 20 and the BC client device 30 can communicate with each other via the network N. In addition, the service providing device 20 and the data user device 50 can communicate with each other via the network N. Furthermore, the BC client device 30 and the BC system 40 can communicate with each other via the network N.

The user terminal 10 is, for example, an information processing device used by a user who deposits personal information to the service providing device 20. The user terminal 10 can be implemented by a smartphone, a tablet terminal, a laptop personal computer (PC), a desktop PC, a mobile phone, a personal digital assistant (PDA), or the like.

The service providing device 20 (an example of an information management device) is an information processing device that manages personal information uploaded by the user of the user terminal 10 using the user terminal 10. In addition, the service providing device 20 gives, for example, a user of the data user device 50, which is a data request source of the personal information, the browsing right of the personal information. In addition, the service providing device 20 receives a zero-knowledge proof from the user of the data user device 50, which is a data request source of the personal information, and provides the personal information on the basis of a verification result of the received proof. The service providing device 20 can be implemented by a server or the like.

The BC client device 30 is an information processing device that records data in the BC system 40 in response to a request from the service providing device 20. The BC client device 30 may be physically or functionally integrated with the BC system 40 described later. Alternatively, the BC client device 30 may be distributed in relation with the BC system 40. The BC client device 30 can be implemented by a server or the like. The processing of the BC client device 30 will be described later.

The BC system 40 is an information processing device that manages each block, in which data such as information regarding a browsing right of personal information or information regarding a verification result of a proof accompanying a request for personal information is compiled, as a blockchain configured by connecting the blocks in the order of processing. The BC system 40 includes, for example, a plurality of information processing devices (nodes) that execute various types of processing such as block generation or blockchain sharing. Each node of the BC system 40 includes, for example, a communication unit implemented by a network interface card (NIC), a communication circuit, or the like and is connected with the network N in a wired or wireless manner. The BC system is presumed to be a permission-type blockchain that can be used by the service providing device 20 or the data user device however, the BC system 40 may have any configuration as long as the processing according to the embodiment of the present disclosure can be implemented.

The data user device 50 is an information processing device used by a user who acquires personal information managed by the service providing device 20. The data user device 50 can be implemented by a smartphone, a tablet terminal, a notebook PC, a desktop PC, a mobile phone, a PDA, or the like. The data user device 50 generates a zero-knowledge proof for proving that the user is a valid user who has been given the browsing right of the personal information from the service providing device 20. The data user device 50 acquires desired personal information from the service providing device 20 by transmitting a data request for the personal information to the service providing device 20 together with the generated proof.

3. Overview of Information Processing

3-1. Example of Information Processing

Figure 2:
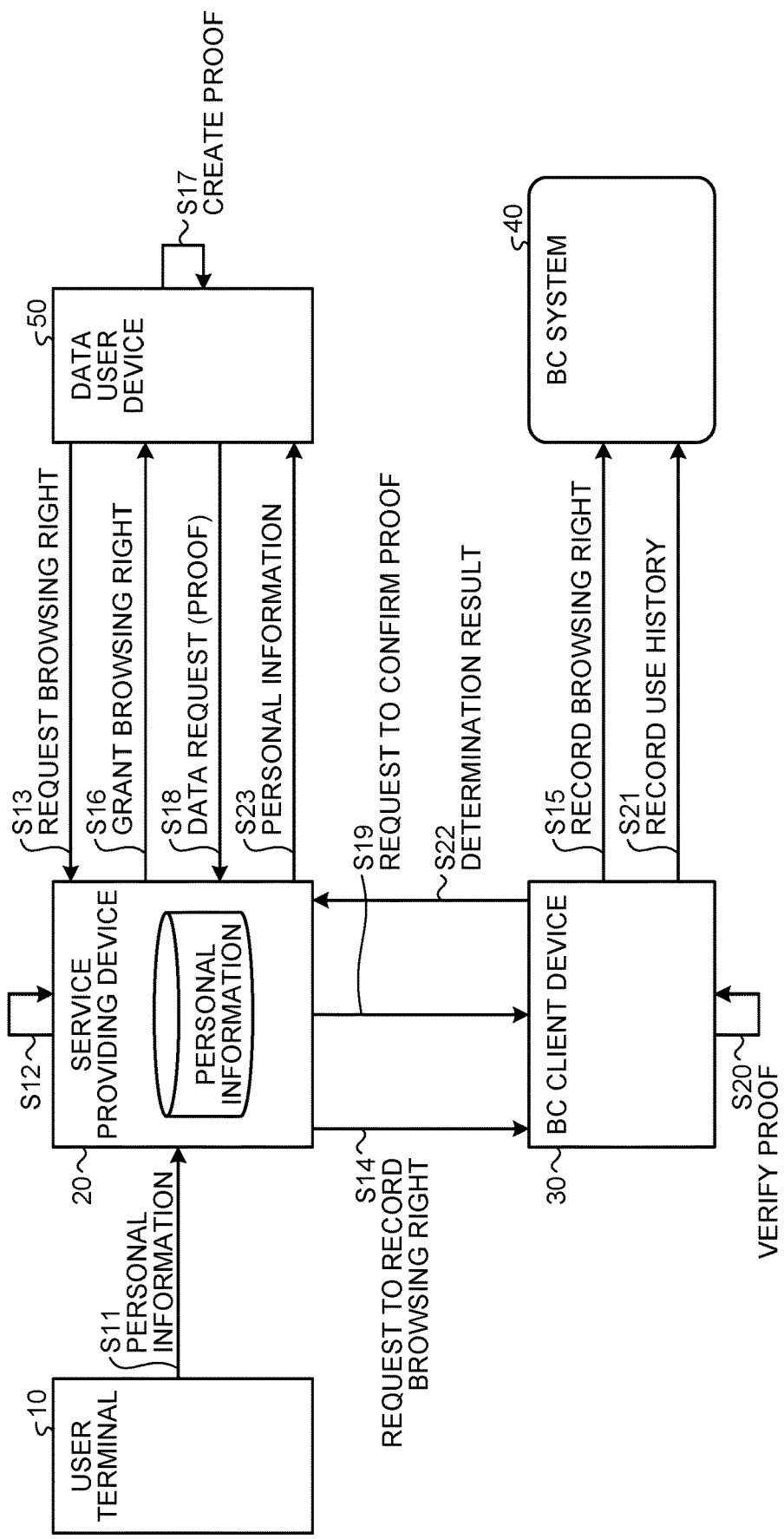
FIG. 2 is a schematic diagram illustrating an example of information processing according to the embodiment of the present disclosure.

Hereinafter, an example of information processing by the information processing system according to the embodiment of the present disclosure will be described. FIG. 2 is a schematic diagram illustrating an example of information processing according to the embodiment of the present disclosure.

As illustrated in FIG. 2, the user terminal 10 transmits personal information to the service providing device 20 (step S11). The service providing device 20 manages personal information received from the user terminal 10 in a local environment (step 12).

The data user device 50 transmits an acquisition request of a browsing right for browsing the personal information to the service providing device 20 (step S13). Upon receiving the acquisition request of the browsing right from the data user device 50, the service providing device 20 transmits a recording request of the browsing right to the BC client device 30 (step S14).

The BC client device 30 records information regarding the browsing right in the BC system 40 in response to the request from the service providing device 20 (step S15). Here, the information regarding the browsing right recorded in the BC system 40 by the BC client device 30 indicates that it is permitted to browse the personal information by the user of the data user device 50, which can include a desired character string or the like. Moreover, the BC client device 30 can record a hash value obtained by hashing the information regarding the browsing right in the BC system 40 instead of recording the information regarding the browsing right in the BC system 40 as it is.

After recording the browsing right by the BC client device 30, the service providing device 20 gives the browsing right to the data user device 50 (step S16). The service providing device 20 provides the data user device 50 with a secret value (a random number or the like) incorporated at the time of hashing the browsing right together with the information regarding the browsing right. The secret value may be a nonce.

When the browsing right is given from the service providing device 20, the data user device 50 generates a zero-knowledge proof for proving that the user is a valid user who has been given the browsing right of the personal information (step S17). Presumed as a proof created by the data user device 50 is an evidence indicating that the BC client device 30 can create the same hash value as the hash value recorded in the BC system 40 in response to a request from the service providing device 20. For example, the data user device 50 is only required to present, to the service providing device 20 as a proof, the hash value itself generated using the secret value given from the service providing device 20. Then, the data user device 50 transmits a data request for the personal information to the service providing device 20 together with the generated proof (step S18).

Upon receiving the data request from the data user device 50, the service providing device 20 transmits a proof confirmation request to the BC client device 30 (step S19). The BC client device 30 executes verification of the proof in response to the proof confirmation request received from the service providing device 20 (step S20). Specifically, the BC client device 30 compares the hash value of the information regarding the browsing record recorded in the BC system 40 with the hash value based on the proof acquired from the service providing device 20 and determines whether or not the hash values match.

The BC client device 30 records the verification result of the proof in the BC system 40 as a use history (step S21). Specifically, the BC client device 30 records, in the BC system 40, information regarding the verification result of the proof indicating whether or not the proof acquired from the data user device 50 is valid. At this time, the BC client device 30 records the use history excluding the record position of the browsing right in such a manner that the record position of the information regarding the browsing right recorded in the BC system 40 is not associated with the proof generated in the data user device 50 at the time of verification of the proof. Furthermore, the BC client device 30 transmits the proof verification result to the service providing device 20 as a determination result (step S22).

The service providing device 20 provides the data user device 50 with the personal information corresponding to the data request (see step S18) received from the data user device 50 on the basis of the determination result of the proof received from the BC client device 30 (step S23).

As described above, the BC client device 30 verifies the proof by comparing the information (hash value) regarding the browsing right recorded in advance in the BC system 40 with the hash value based on the proof generated in the data user device 50. In the zero-knowledge proof using the "Merkle Tree", it is necessary to acquire all pieces of data necessary for calculation of the hash value from the block data recorded in the blockchain and to repeatedly calculate hash values up to the node serving as the root is reached using the acquired data, however, in the zero-knowledge proof of the embodiment of the present disclosure, the calculation of the hash value only needs to be performed once in the data user device 50, and it is only required to compare the generated hash value and the recorded hash value. This enables prompt service provision (provision of personal information).

Furthermore, when recording the verification result in the BC system 40, the BC client device 30 does not record information that associates the information (hash value) regarding the browsing right on the BC system 40 used at the time of verification of the proof with the proof generated in the data user device 50. As a result, in the BC system 40 (blockchain), anonymity equivalent to that of the "Merkle Tree" can be implemented. For this reason, according to the embodiment of the present disclosure, it is possible to implement prompt service provision while ensuring anonymity.

3-2. Service Examples

Figure 3:
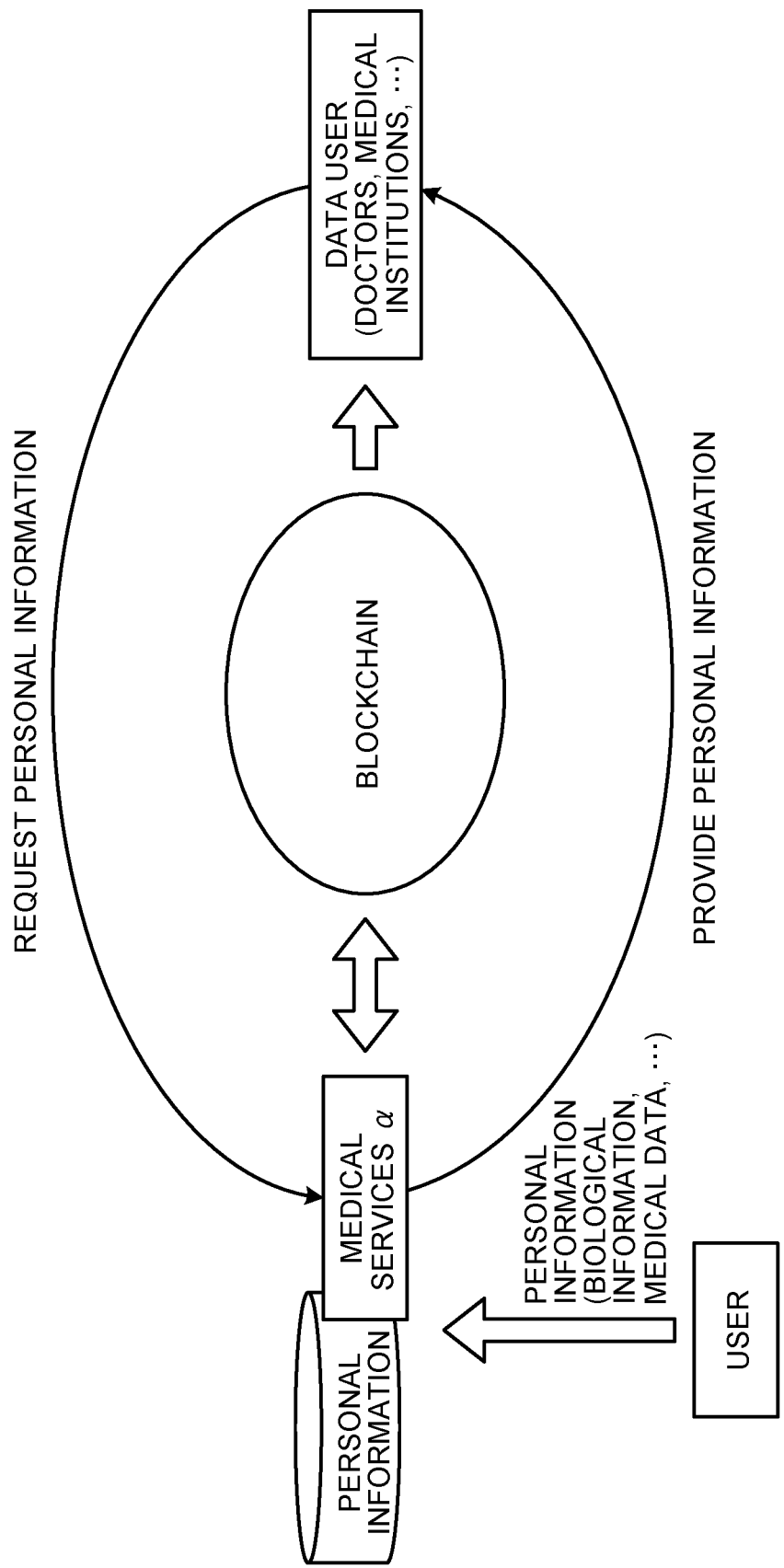
FIG. 3 is a schematic diagram illustrating an overview of a service form according to the embodiment of the present disclosure.
Figure 4:
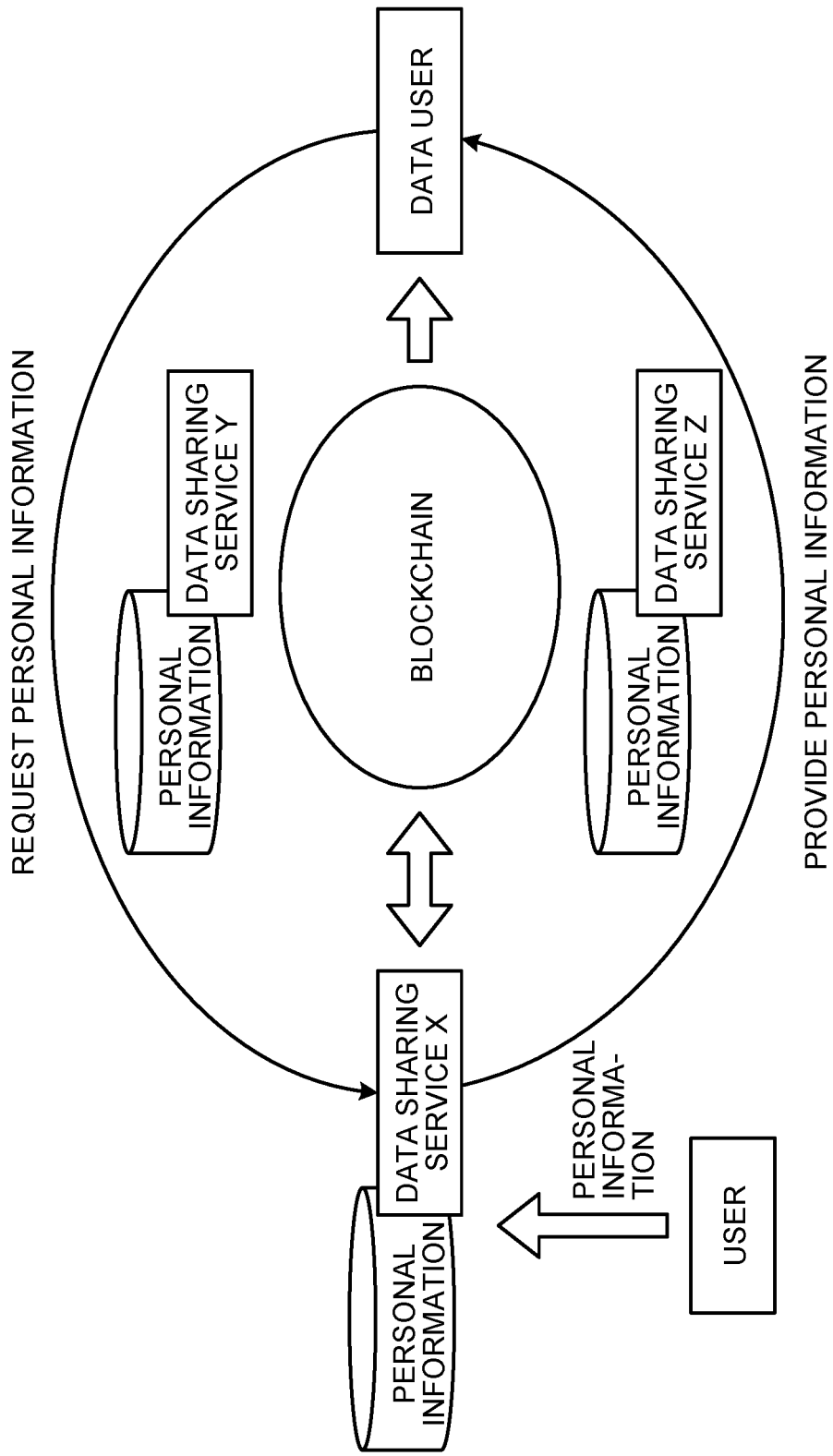
FIG. 4 is a schematic diagram illustrating an overview of a service form according to the embodiment of the present disclosure.

Examples of the service form implemented by the information processing system according to the embodiment of the present disclosure will be described using FIGS. 3 and 4. FIGS. 3 and 4 are schematic diagrams illustrating overviews of service forms according to the embodiment of the present disclosure.

FIG. 3 is a diagram illustrating a service form in which medical service α provides biological information, medical data, and the like of a user managed by the medical service α to a doctor, a medical institution, or the like that is a data user. The user illustrated in FIG. 3 corresponds to the user of the user terminal 10 illustrated in FIG. 1 or 2. The medical service α illustrated in FIG. 3 corresponds to the service providing device 20 illustrated in FIG. 1 or 2. The blockchain illustrated in FIG. 3 corresponds to the BC client device 30 or the BC system 40 illustrated in FIG. 1 or 2. The data user illustrated in FIG. 3 corresponds to the user of the data user device 50 illustrated in FIG. 1 or 2.

The user uploads biological information (vital signs) measurable by a predetermined measuring device such as an electrocardiogram, a heart rate, a blood pressure, and a body temperature, medical data such as a medical record or a health examination result in a medical institution, and the like to the medical service α and registers them in advance.

The medical service α registers and manages biometric information or medical data uploaded from the user as personal information. When registering biometric information or medical data, the medical service α inquires whether or not the user agrees to data provision to a doctor or a medical institution. The medical service α may allow registration of personal information on the condition of a consent to the data provision. The medical service α records information regarding the browsing right of the personal information in the blockchain in response to a request from the data user and gives the browsing right to the data user.

The data user generates a zero-knowledge proof based on the browsing right and transmits a data request to the medical service α together with the generated proof.

The medical service α acquires the personal information corresponding to the data request on the basis of the verification result of the proof included in the data request received from the data user and provides the acquired personal information to the data user. In addition, the medical service α records the use history of the browsing right in the blockchain.

FIG. 4 is a diagram illustrating a service form in which data sharing service X provides personal information or the like that the data sharing service X manages to a data user or others. The user illustrated in FIG. 4 corresponds to the user of the user terminal 10 illustrated in FIG. 1 or 2. Data sharing services X, Y, and Z illustrated in FIG. 4 correspond to the service providing device 20 illustrated in FIG. 1 or 2. The blockchain illustrated in FIG. 4 corresponds to the BC client device 30 or the BC system 40 illustrated in FIG. 1 or 2. The data user illustrated in FIG. 4 corresponds to the user of the data user device 50 illustrated in FIG. 1 or 2. Note that the data sharing services X, Y, and Z illustrated in FIG. 4 have the same function. Hereinafter, an example of service executed via the data sharing service X will be described.

The user uploads information of demographic attributes such as the age, the gender, and the gender, position information, data such as use history of the application, and the like to the data sharing service X and registers them in advance.

The data sharing service X registers and manages personal information uploaded by the user. When registering personal information, the data sharing service X inquires whether or not the user agrees to data provision to the data user. The data sharing service X may allow registration of personal information on the condition of a consent to the data provision. The data sharing service X records information regarding the browsing right of the personal information in the blockchain in response to a request from the data user and gives the browsing right to the data user.

The data user generates a zero-knowledge proof based on the browsing right and transmits a data request to the data sharing service X together with the generated proof.

The data sharing service X acquires the personal information corresponding to the data request on the basis of a verification result of the proof included in the data request received from the data user and provides the acquired personal information to the data user. In addition, the data sharing service X records the use history of the personal information in the blockchain. In addition, in a case where a reward corresponding to the use of personal information is given to the user, the data sharing service X may record information regarding the reward in the blockchain accordingly.

As described above, the information processing system 1 according to the embodiment of the present disclosure can be applied to various types of services related to provision of personal information as described above.

4. Device Configuration Example

Figure 5:
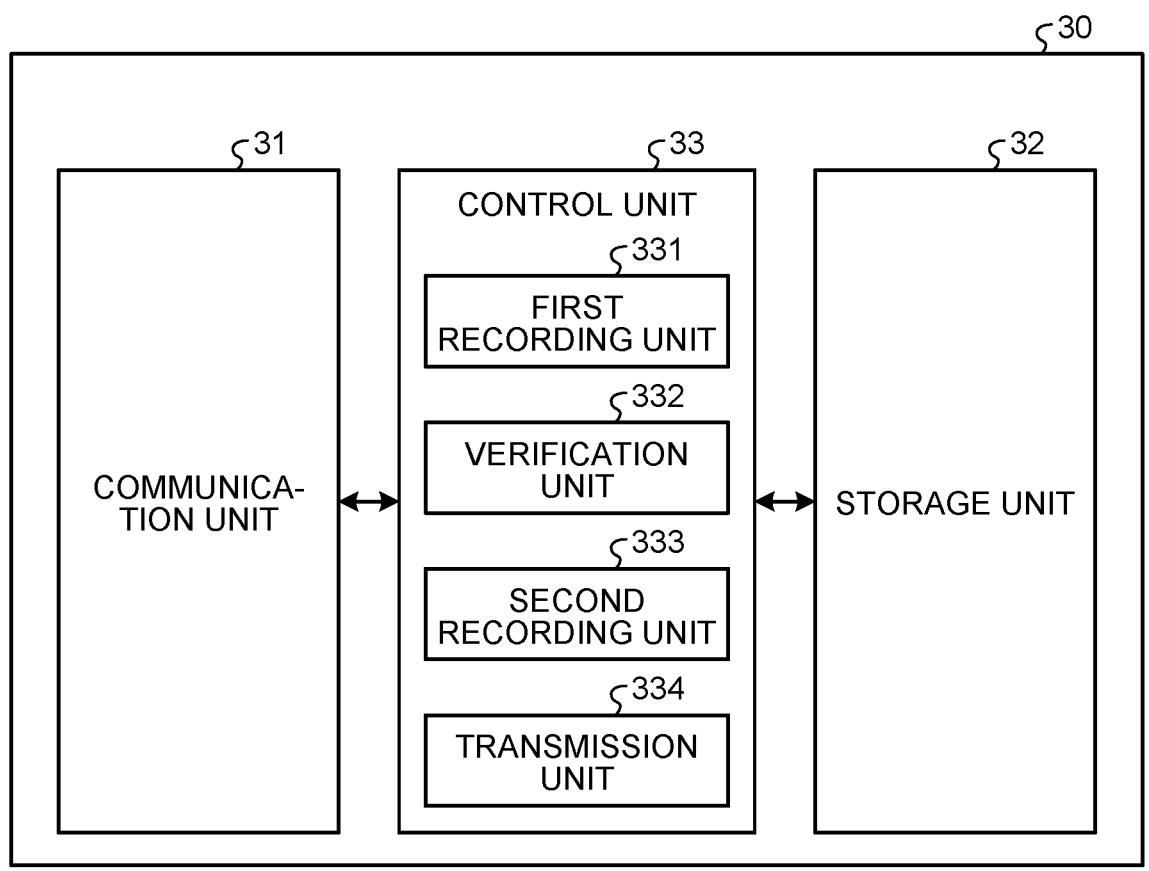
FIG. 5 is a block diagram illustrating a configuration example of a BC client device according to the embodiment of the present disclosure.

Hereinafter, the configuration of the BC client device 30 according to the embodiment of the present disclosure will be described. FIG. 5 is a block diagram illustrating a configuration example of the BC client device according to the embodiment of the present disclosure.

The BC client device 30 is an information processing device that executes data recording or the like in the blockchain in response to a request from the service providing device 20. The BC client device 30 may be one of information processing devices included in the BC system 40 or may be an information processing device independent from the BC system 40.

As illustrated in FIG. 5, the BC client device 30 includes a communication unit 31, a storage unit 32, and a control unit 33.

The communication unit 31 is implemented by, for example, a network interface card (NIC), various communication modems, or the like. The communication unit 31 communicates with the service providing device 20 via the network N to transmit and receive various types of information.

The storage unit 32 is implemented by, for example, a semiconductor memory element such as a random access memory (RAM) or a flash memory or a storage device such as a hard disk or an optical disk. The storage unit 32 can store, for example, programs, data, and the like for implementing various processing functions executed by the control unit 33. The programs stored in the storage unit 32 include a program for implementing a processing function corresponding to each of units of the control unit 33. The programs stored in the storage unit 32 include an operating system (OS) and various application programs.

The control unit 33 includes a first recording unit 331, a verification unit 332, a second recording unit 333, and a transmission unit 334. Each of the functional units included in the control unit 33 is implemented by a control circuit including a processor and a memory. Each of the functional units included in the control unit 33 is implemented, for example, by executing a command written in a program read from an internal memory by a processor using the internal memory as a work area. The programs read from the internal memory by the processor include an operating system (OS) and application programs. Furthermore, each of the functional units of the control unit 33 may be implemented by, for example, an integrated circuit such as an application specific integrated circuit (ASIC) or a field-programmable gate array (FPGA).

Furthermore, a main storage device or an auxiliary storage device functioning as the internal memory described above is implemented by, for example, a semiconductor memory element such as a random access memory (RAM) or a flash memory or a storage device such as a hard disk or an optical disc.

The first recording unit 331 records the information regarding the browsing right of data in the BC system 40 in response to a request from the service providing device 20 that manages the data. For example, upon receiving a recording request of the browsing right from the service providing device 20, the first recording unit 331 writes and records a hash value included in the recording request in the BC system 40. The hash value generated by the service providing device 20 is generated by using the "HMAC (hash-based message authentication code)" using the information regarding the browsing right that the service providing device 20 gives to the request source of the browsing right, the secret value that the service providing device 20 shares with the request source of the browsing right in a limited manner, and a public key provided from the request source of the browsing right. In addition to "HMAC (Hash-based Message Authentication Code)", any hash function such as "SHA-256 (Secure Hash Algorithm 256-bit)" or "Pedersen Commitment" can be used as the hash function used to generate the hash value.

The verification unit 332 verifies the zero-knowledge proof for proving that the user is a valid user having the browsing right on the basis of the information regarding the browsing right written in the blockchain. Specifically, upon receiving a proof confirmation request from the service providing device 20, the verification unit 332 acquires a keyed hash value of the information regarding the browsing right from the BC system 40 on the basis of the writing position (record position) of the browsing right included in the confirmation request. The verification unit 332 verifies the proof by comparing the acquired keyed hash value with a keyed hash value generated on the basis of the proof included in the confirmation request. If the hash values are the same, the verification unit 332 determines that the user is a valid user having the browsing right.

The second recording unit 333 records the information regarding the verification result of the proof by the verification unit 332 in the BC system 40. When recording the information regarding the verification result of the proof in the BC system 40, the second recording unit 333 does not record information associating the proof with the information regarding the browsing right. For example, the second recording unit 333 writes, in the BC system 40, information other than the writing position (record position) of the information regarding the browsing right that has been used for verification of the proof among the information regarding the verification of the proof.

The transmission unit 334 transmits, to the service providing device 20, a determination result as to whether or not the request source of the data is a valid user having the browsing right.

Figure 6:
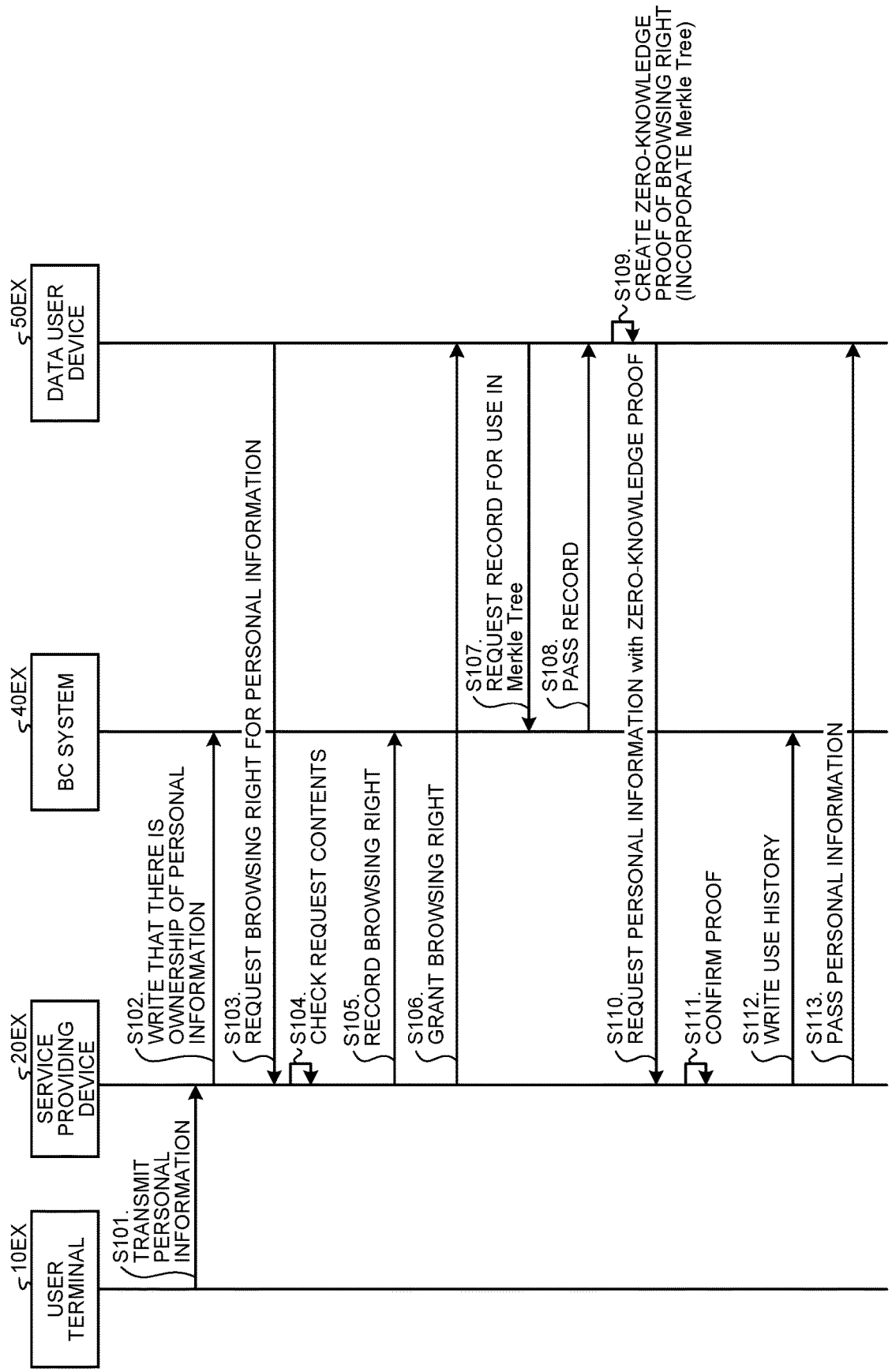
FIG. 6 is a sequence diagram illustrating an example of a processing procedure according to a comparative example.

5. Processing Procedure Example 5-1. Flow of Processing According to Comparative Example An example of a processing procedure in a case where a "Merkle Tree" is used as the zero-knowledge proof will be described as a processing procedure according to a comparative example using FIG. 6. FIG. 6 is a sequence diagram illustrating an example of the processing procedure according to the comparative example.

As illustrated in FIG. 6, a user terminal 10EX transmits personal information to a service providing device 20EX (step S101). The service providing device 20EX writes and records the fact that the service providing device 20EX has the ownership of the personal information in a BC system 40EX (step S102).

In addition, a data user device 50EX transmits an acquisition request of the browsing right of the personal information to the service providing device 20EX (step S103).

The service providing device 20EX confirms the content of the acquisition request of the browsing right (step S104) and executes recording of the browsing right in the BC system 40EX (step S105). Then, the service providing device 20EX gives the browsing right to the data user device 50EX (step S106).

The data user device 50EX transmits a request for a record to be used for the "Merkle Tree" to the BC system 40EX (step S107). In response to the request from the data user device 50EX, the BC system 40EX passes the record to be used for the "Merkle Tree" to the data user device 50EX (step S108).

The data user device 50EX creates a zero-knowledge proof for the browsing right incorporating the "Merkle Tree" (step S109). Then, the data user device 50EX transmits the zero-knowledge proof to the service providing device 20EX together with the data request for the personal information (step S110).

The service providing device 20EX confirms the zero-knowledge proof (step S111) and writes and records the use history in the BC system 40 (step S112). Then, if the user of the data user device 50EX has a valid browsing right, the service providing device 20EX provides the user of the data user device 50EX with personal information corresponding to the data request (step S113).

Figure 7:
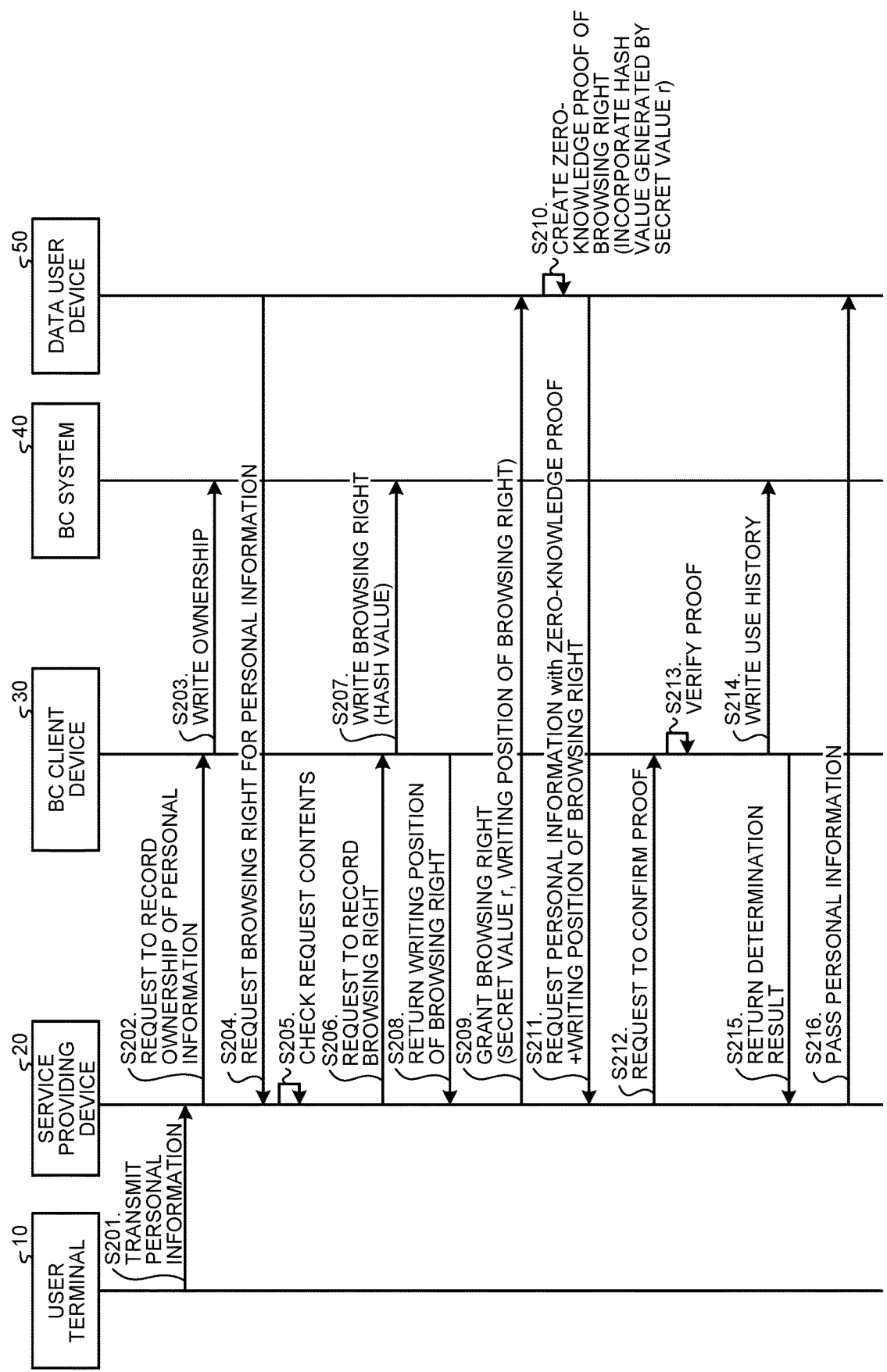
FIG. 7 is a sequence diagram illustrating an example of a processing procedure according to the embodiment of the present disclosure.

5-2. Processing Procedure Example According to Embodiment of Present Disclosure A processing procedure example according to the embodiment of the present disclosure will be described using FIG. 7. FIG. 7 is a sequence diagram illustrating an example of a processing procedure according to the embodiment of the present disclosure.

As illustrated in FIG. 7, the user terminal 10 transmits personal information to the service providing device 20 (step S201). The service providing device 20 transmits a recording request of the ownership of the personal information to the BC client device 30 (step S202). In response to the request from the service providing device 20, the BC client device 30 writes and records the ownership of the personal information in the BC system 40 (step S203).

In addition, the data user device 50 transmits an acquisition request of the browsing right of the personal information to the service providing device 20 (step S204). Note that the data user device 50 creates a key pair of a public key and a private key in advance and provides the public key to the service providing device 20 when requesting acquisition of the browsing right to the service providing device 20.

The service providing device 20 confirms the content of the acquisition request of the browsing right (step S205) and transmits a recording request of the browsing right to the BC client device 30 (step S206). The service providing device 20 generates a hash value of the information regarding the browsing right, includes the hash value in the recording request of the browsing right, and thereby transmits the hash value. The hash value is generated by using the information regarding the browsing right, the secret value "r" exclusively shared with the data user device 50 that is the request source of the browsing right, and the public key provided from the data user device 50 that is the request source of the browsing right.

In response to the request from the service providing device 20, the BC client device 30 writes and records the information regarding the browsing right (hash value) in the BC system 40 (step S207). Then, the BC client device 30 returns the writing position (record position) of the information regarding the browsing right to the service providing device 20 (step S208).

The service providing device 20 gives a browsing right to the data user device 50 (step S209). The service providing device 20 provides the data user device 50 with the secret value "r" and the writing position (record position) of the hash value of the information regarding the browsing right in the BC system 40 as the browsing right.

The data user device 50 creates a zero-knowledge proof of the browsing right (step S210). Specifically, the data user device 50 inputs a secret key paired with the public key provided to the service providing device 20 to a public key generation function to generate a public key. The data user device 50 creates a zero-knowledge proof that generates a hash value from a hash function on the basis of the generated public key, the secret value "r" provided from the service providing device 20, and the information regarding the browsing right. Then, the data user device 50 transmits the zero-knowledge proof and the writing position (record position) of the browsing right to the service providing device 20 together with a data request for the personal information (step S211).

The service providing device 20 transmits a proof confirmation request to the BC client device 30 (step S212). The BC client device 30 verifies the proof of the data user device in response to the request from the service providing device (step S213). Specifically, the BC client device 30 acquires, from the BC system 40, the hash value recorded at the browsing information writing position (record position) included in the data request transmitted from the data user device 50 to the service providing device 20. The BC client device 30 verifies the proof of the data user device 50 by comparing the hash value acquired from the BC system 40 with the hash value created on the basis of the proof of the data user device 50.

The BC client device 30 writes and records the information regarding the verification result of the proof in the BC system 40 as a use history (step S214). At this point, the BC client device 30 does not record, in the BC system 40, information that associates the hash value on the BC system 40 used for the verification of the proof with the hash value generated on the basis of the proof among the information regarding the verification result of the proof. Then, the BC client device 30 returns a determination result as to whether or not the user of the data user device 50 has a valid browsing right to the service providing device 20 (step S215).

In a case where the user of the data user device 50 has a valid browsing right on the basis of the determination result acquired from the BC client device 30, the service providing device 20 passes the personal information corresponding to the data request to the data user device 50 (step S216).

In the processing procedure according to the above-described comparative example (see FIG. 6), the fact that the user of the data user device 50EX has a valid browsing right is proved by the zero-knowledge proof using the "Merkle Tree". Therefore, the amount of calculation increases, which may delay the processing before provision of the personal information. For example, it may take time to acquire the block data recorded in the blockchain in step S107 or step S108 described above, to create the proof in step 109 described above, or to create the tree structure in step S111 described above.

On the other hand, in the processing procedure according to the embodiment of the present disclosure (see FIG. 7), the BC client device 30 verifies the zero-knowledge proof for proving that the user of the data user device 50 has a valid browsing right. In this proof, a hash value generated using the secret value "r" limitedly shared between the service providing device 20 and the data user device 50 is incorporated. As a result, when verifying the proof, the BC client device 30 does not need the time required to acquire the block data necessary for verification of the proof from the blockchain, the time required to calculate the hash value repeatedly executed until the node serving as the root is reached, and others, which can speed up the processing as compared with the case of using the "Merkle Tree". Furthermore, in the processing procedure according to the embodiment of the present disclosure (see FIG. 7), when recording the information regarding the verification result of the proof in the blockchain, the BC client device 30 does not record the information associating the proof with the information regarding the browsing right. As a result, anonymity equivalent to that of the "Merkle Tree" can be implemented on the blockchain. Note that by arranging the BC client device 30 between the service providing device 20 and the BC system 40, the availability of the information processing system 1 can be enhanced even in a case where there is a new entry into the blockchain operated by the BC system 40. That is, in a case where the service providing device 20 directly participates in the blockchain, it is necessary to interact with other participants in order to fulfill the function as the distributed ledger. On the other hand, as in the embodiment of the present disclosure, with exchange with the blockchain via the BC client device 30, even in a case where the service providing device 20 fails, with the BC client device 30 separating the dependence relationship with the service providing device 20, other blockchain participants can continue to provide the service.

6. Modification 6-1. Update of Browsing Right

Figure 8:
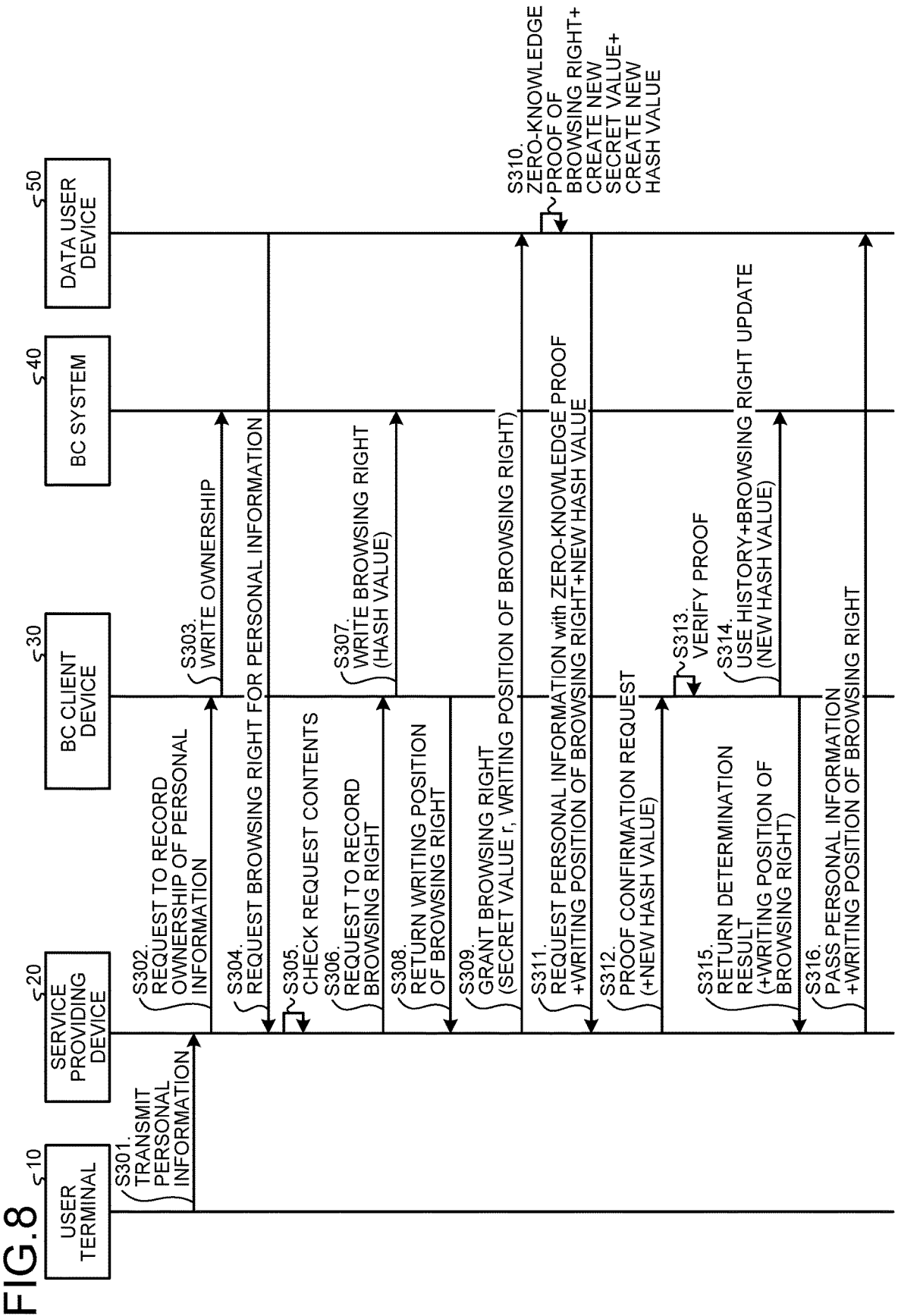
FIG. 8 is a sequence diagram illustrating an example of a processing procedure according to a modification of the present disclosure.

In the above embodiment, the second recording unit 333 may update the information regarding the browsing right and record the updated information in the BC system 40 each time the verification unit 332 verifies a proof. In this manner, by limiting the number of times of use of the proof generated in the data user device 50 and used for the zero-knowledge proof to only one time, it becomes possible to prevent reuse of the proof due to interception of the data in advance. Hereinafter, a flow of processing regarding update of the browsing right will be described using FIG. 8. FIG. 8 is a sequence diagram illustrating an example of a processing procedure according to a modification of the present disclosure. In the processing illustrated in FIG. 8, the processing in steps S310, S311, S314, and S316 is different from the processing illustrated in FIG. 7.

As illustrated in FIG. 8, the user terminal 10 transmits personal information to the service providing device 20 (step S301). The service providing device 20 transmits a recording request of the ownership of the personal information to the BC client device 30 (step S302). In response to the request from the service providing device 20, the BC client device 30 writes and records the ownership of the personal information in the BC system 40 (step S303).

In addition, the data user device 50 transmits an acquisition request of the browsing right of the personal information to the service providing device 20 (step S304). The service providing device 20 confirms the content of the acquisition request of the browsing right (step S305) and transmits a recording request of the browsing right to the BC client device 30 (step S306).

In response to the request from the service providing device 20, the BC client device 30 writes and records the information regarding the browsing right (hash value) in the BC system 40 (step S307). Then, the BC client device 30 returns the writing position (record position) of the information regarding the browsing right to the service providing device 20 (step S308). The service providing device 20 gives a browsing right to the data user device 50 (step S309).

The data user device 50 creates a zero-knowledge proof of the browsing right and also creates a new secret value and a new hash value based on the new secret value (step S310). Then, the data user device 50 transmits the zero-knowledge proof, the writing position (record position) of the browsing right, and the new hash value to the service providing device 20 together with a data request for the personal information (step S311). By transmitting the hash value based on the new secret value instead of the new secret value, security against a man-in-the-middle attack can be ensured.

The service providing device 20 transmits the proof confirmation request to the BC client device 30 (step S312). In addition, the service providing device 20 transmits the new hash value received from the data user device 50 to the BC client device 30 together with the proof confirmation request.

The BC client device 30 verifies the proof of the data user device 50 in response to the request from the service providing device 20 (step S313). In addition, the BC client device 30 writes and records the information regarding the proof verification result in the BC system 40 as a use history and updates the browsing right with the new hash value received from the service providing device 20 (step S314). As a result, a data request using an old proof is no longer accepted next time when the data is used.

Then, the BC client device 30 returns a determination result as to whether or not the user of the data user device 50 has a valid browsing right to the service providing device 20 (step S315). At this point, the BC client device 30 sends the writing position (record position) of the updated information (new hash value) regarding the browsing right to the service providing device 20.

In a case where the user of the data user device 50 has a valid browsing right on the basis of the determination result acquired from the BC client device 30, the service providing device 20 passes the writing position (record position) of the information regarding the updated browsing right to the data user device 50 together with the personal information corresponding to the data request (step S316).

Note that in a case where the data user device 50 acquires the data again, the new secret value created in step S310, which is the basis of the new hash value transmitted to the service providing device 20 in step S311, is used. The BC client device 30 always uses the most recent hash value and rejects proofs based on old hash values.

6-2. Invalidation of Browsing Right

Figure 9:
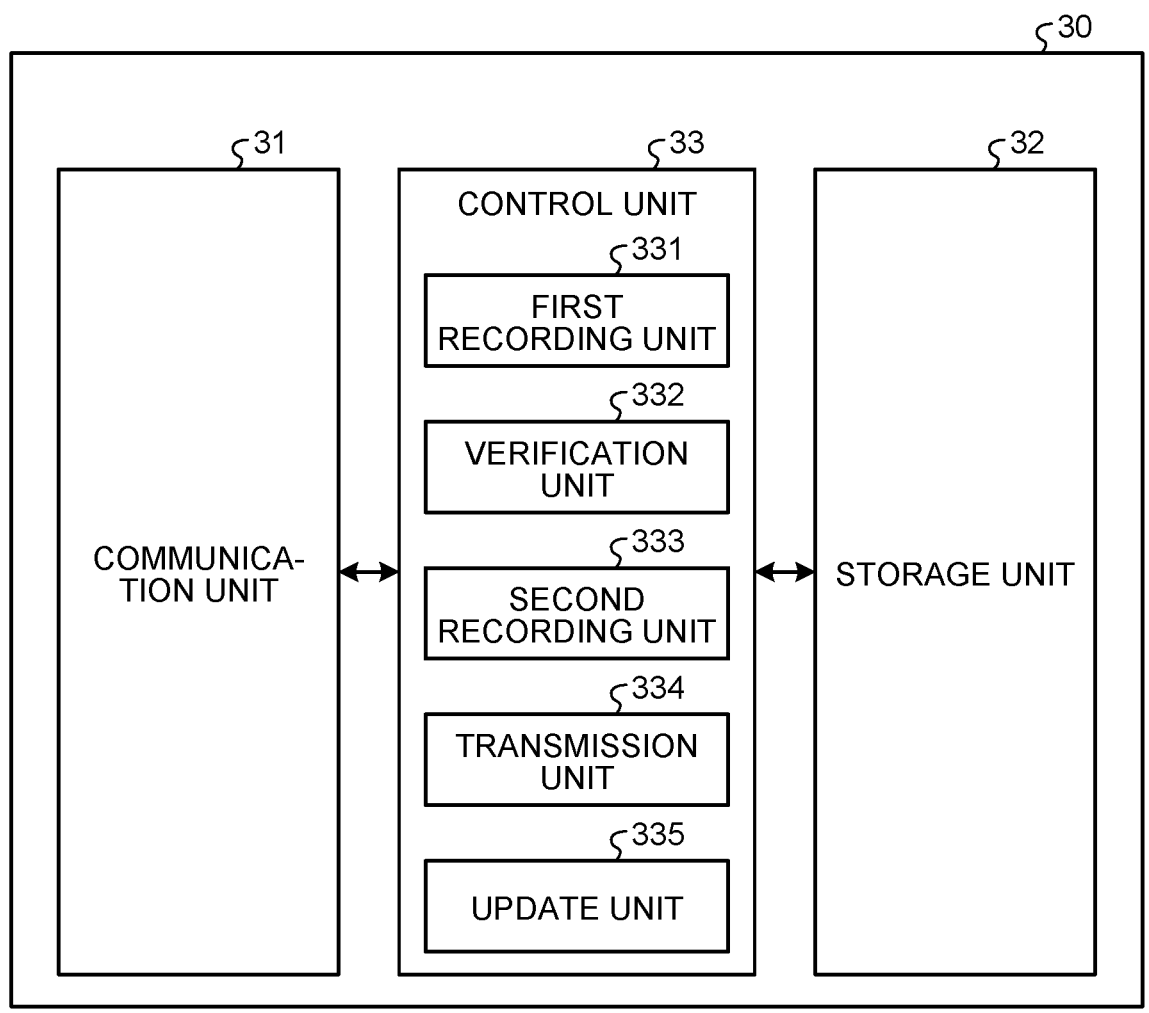
FIG. 9 is a block diagram illustrating a configuration example of a BC client device according to the modification of the present disclosure.

In the above embodiment, the BC client device 30 may record a revocation list, listing targets for whom a browsing right is to be canceled, in the BC system 40. FIG. 9 is a block diagram illustrating a configuration example of the BC client device according to the modification of the present disclosure. The BC client device 30 according to the modification is different from the above-described embodiment in that an update unit 335 is included.

The update unit 335 updates the revocation list recorded in the BC system 40 in response to a request from the service providing device 20. Prior to verification of a proof, the verification unit 332 verifies whether or not a prover of the proof is included in the revocation list.

Figure 10:
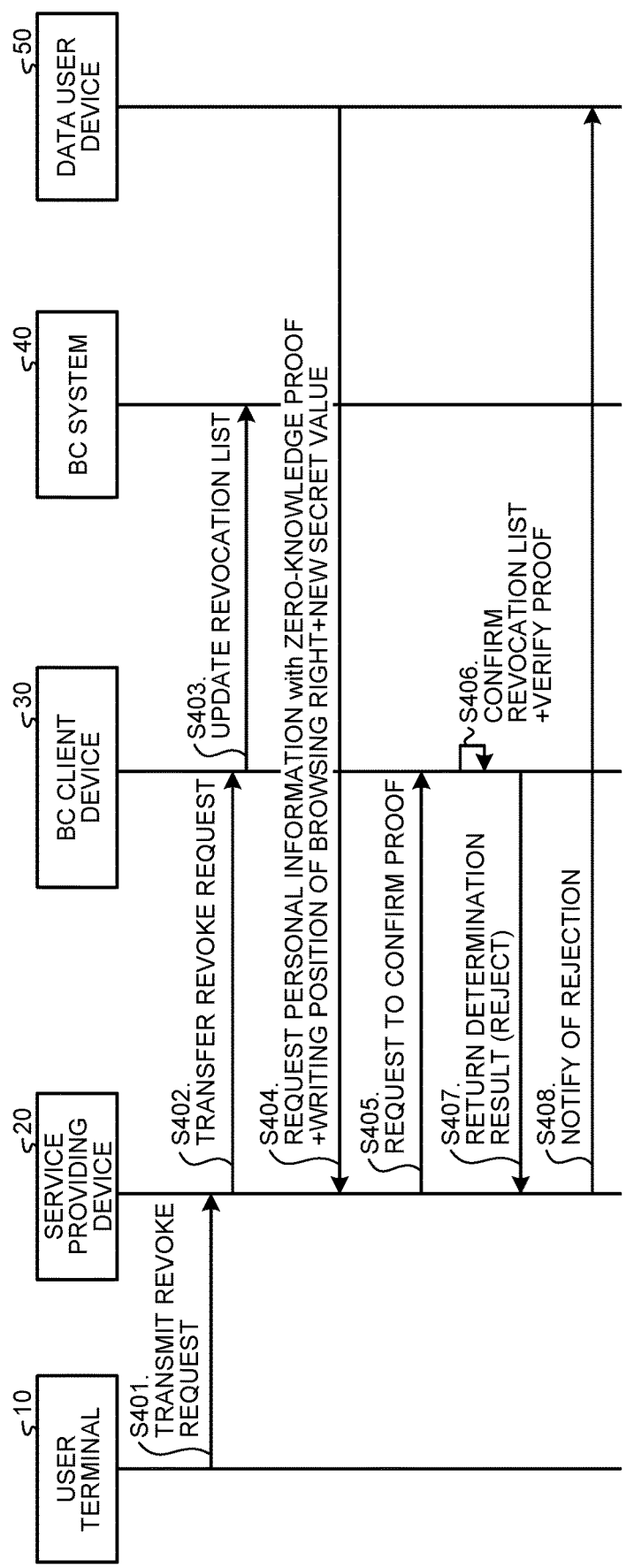
FIG. 10 is a sequence diagram illustrating an example of a processing procedure according to the modification of the present disclosure.

Hereinafter, a flow of processing regarding invalidation of a browsing right will be described using FIG. 10. FIG. 10 is a sequence diagram illustrating an example of a processing procedure according to the modification of the present disclosure. Note that FIG. 10 illustrates an example of a processing flow of a case where the user of the data user device 50 is a target for whom a browsing right is to be canceled (revoke target).

As illustrated in FIG. 10, the user terminal 10 transmits a revoke request to the service providing device 20 (step S401). The service providing device 20 transfers the revoke request to the BC client device 30 (step S402).

The BC client device 30 updates the revocation list recorded in the BC system 40 in response to the revoke request received from the service providing device 20 (step S403).

The data user device 50 transmits the zero-knowledge proof, the writing position (record position) of the browsing right, and the new secret value to the service providing device 20 together with a data request for the personal information (step S404).

The service providing device 20 transmits a proof confirmation request to the BC client device 30 (step S405).

Upon receiving the proof confirmation request from the service providing device 20, the BC client device 30 executes confirmation of the revocation list and verification of the proof (step S406). In a case where the user of the data user device 50 corresponds to a revocation target in the revocation list, the BC client device 30 does not execute verification of the proof. Specifically, the BC client device 30 refers to the revocation list recorded in the BC system 40 and confirms whether or not the prover of the proof (user of the data user device 50) is a revocation target. Then, if the prover of the proof is a revoke target, the BC client device 30 returns rejection as a determination result (that it is a revoke target) to the service providing device 20 without executing verification of the proof (step S407). Note that the BC client device 30 executes verification of the proof in a similar manner to that in the above-described embodiment in a case where the prover of the proof does not correspond to a revoke target in the revocation list.

The service providing device 20 notifies the user of the data user device 50 of the rejection on the basis of the verification result received from the BC client device 30 (step S408).

7. Others

The BC client device 30 according to the embodiment and the modification of the present disclosure may be implemented by a dedicated computer system or by a general-purpose computer system.

Furthermore, various programs for implementing the information processing method executed by the BC client device according to the embodiment and the modification of the present disclosure may be stored and distributed in a computer-readable recording medium such as an optical disk, a semiconductor memory, a magnetic tape, or a flexible disk. In this case, the BC client device 30 according to the embodiment and the modification of the present disclosure can implement the information processing method according to the embodiment and the modification of the present disclosure by installing and executing various programs in and on a computer.

In addition, various programs for implementing the information processing method executed by the BC client device according to the embodiment and the modification of the present disclosure may be stored in a disk device included in a server on a network such as the Internet to enable downloading to a computer. Furthermore, functions provided by various programs for implementing the information processing method executed by the BC client device 30 according to the embodiment and the modification of the present disclosure may be implemented by cooperation of an OS and an application program. In this case, a portion other than the OS may be stored in a medium and distributed, or a portion other than the OS may be stored in an application server to enable downloading or the like to a computer.

Among the processing described in the embodiment and the modification of the present disclosure, the entirety or a part of the processing described as that performed automatically can be performed manually, or the entirety or a part of the processing described as that performed manually can be performed automatically by a known method. In addition, a processing procedure, a specific name, and information including various types of data or parameters illustrated in the above or in the drawings can be modified as desired unless otherwise specified. For example, various types of information illustrated in the drawings are not limited to the information is illustrated.

In addition, each component of the BC client device 30 according to the embodiment and the modification of the present disclosure is conceptual in terms of function and is not necessarily physically configured as illustrated in the drawings. That is, the specific form of distribution and integration of devices is not limited to those illustrated in the drawings, and all or a part thereof can be functionally or physically distributed or integrated in any unit depending on various loads, use status, and the like. For example, the verification unit 332 and the second recording unit 333 included in the control unit 33 of the BC client device 30 may be functionally integrated.

In addition, the embodiment and the modification of the present disclosure can be combined as appropriate as long as there is no conflict in the processing content. In addition, the order of the steps illustrated in the flowcharts of the present embodiment can be modified as appropriate.

Although the embodiment and the modification of the present disclosure have been described above, the technical scope of the present disclosure is not limited to the above embodiment and modification, and various modifications can be made without departing from the gist of the present disclosure. In addition, components of different embodiments and modifications may be combined as required.

8. Hardware Configuration Example

Figure 11:
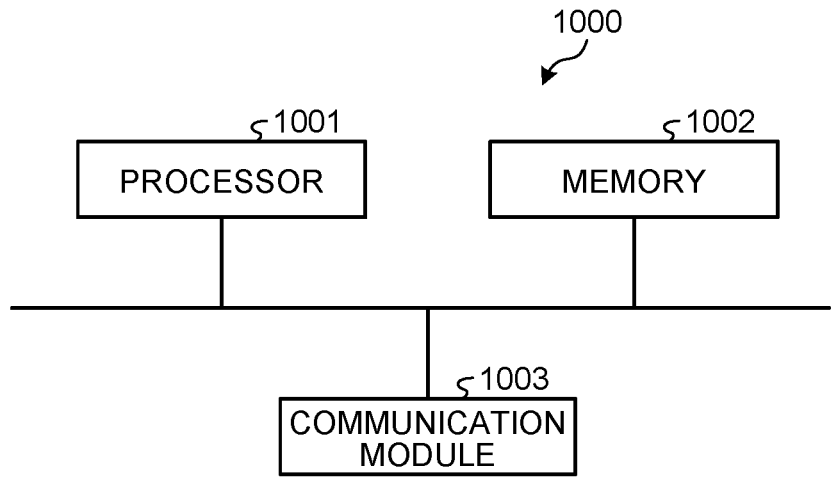
FIG. 11 is a block diagram illustrating a hardware configuration example of a computer capable of implementing the BC client devices according to the embodiment and the modification of the present disclosure.

A hardware configuration example of a computer capable of implementing the BC client device 30 according to the embodiment and the modification of the present disclosure will be described using FIG. 11. FIG. 11 is a block diagram illustrating a hardware configuration example of a computer capable of implementing the BC client devices according to the embodiment and the modification of the present disclosure. Note that FIG. 11 is a diagram illustrating an example of a computer, and it is not necessarily limited to the configuration illustrated in FIG. 11.

As illustrated in FIG. 11, the BC client device 30 according to the embodiment or the modification of the present disclosure can be implemented by, for example, a computer 1000 including a processor 1001, a memory 1002, and a communication module 1003.

The processor 1001 is typically a central processing unit (CPU), a digital signal processor (DSP), a system-on-a-chip (SoC), a system large scale integration (LSI), or the like.

The memory 1002 is typically a nonvolatile or volatile semiconductor memory such as a random access memory (RAM), a read only memory (ROM), or a flash memory or a magnetic disk. The storage unit 32 included in the BC client devices 30 is implemented by the memory 1002.

The communication module 1003 is typically a communication card for a wired or wireless local area network (LAN), long term evolution (LTE), Bluetooth (registered trademark), or a wireless USB (WUSB), a router for optical communication, various communication modems, or the like. The function of the communication unit 31 of the BC client device 30 according to the above embodiment is implemented by the communication module 1003.

The processor 1001 functions as, for example, an arithmetic processing device or a control device and controls the overall operation of each component or a part thereof on the basis of various programs recorded in the memory 1002. The functional units (the first recording unit 331, the verification unit 332, the second recording unit 333, the transmission unit 334, and the update unit 335) included in the BC client device 30 are implemented by the processor 1001 reading an information processing program, in which commands for operating as the functional units are described, from the memory 1002 and executing the information processing program.

That is, the processor 1001 and the memory 1002 implement information processing by the functional units included in the BC client device 30 in cooperation with software (information processing program stored in the memory 1002).

9. CONCLUSION

The BC client device 30 (an example of an information processing device) according to the embodiment of the present disclosure includes the first recording unit 331, the verification unit 332, and the second recording unit 333. In response to a request from the service providing device 20 (an example of an information management device) that manages data, the first recording unit 331 records information regarding a browsing right of data (for example, personal information) in the BC system 40 (an example of a blockchain). The verification unit 332 verifies a zero-knowledge proof for proving that the user is a valid user who has been given the browsing right on the basis of the information regarding the browsing right written in the BC system 40. The second recording unit 333 records the information regarding a verification result of the proof in the BC system 40. With this configuration, the BC client device 30 can implement prompt service provision while ensuring anonymity.

In addition, the first recording unit 331 records a hash value (for example, a keyed hash value) obtained by hashing the information regarding the browsing right (for example, a desired character string) in the BC system 40 using the secret information (for example, secret Information: "r") shared between a data requester (for example, the user of the data user device 50) who requests the data and the service providing device 20. As a result, a use history can be tracked without directly recording personal information in the blockchain.

Furthermore, when recording the information regarding a verification result of a proof in the blockchain, the second recording unit 333 does not record information associating the proof with the information regarding the browsing right. As a result, in the BC system 40 (blockchain), anonymity equivalent to that of the "Merkle Tree" can be implemented.

In addition, every time the verification unit 332 performs verification, the second recording unit 333 updates the information regarding the browsing right and records the updated information in the BC system 40. This makes it possible to prevent reuse of the proof due to interception of data in advance.

Furthermore, the BC client device 30 further includes the update unit 335 that updates a revocation list recorded in the BC system 40 in response to a request from the service providing device 20. Furthermore, prior to verification of a proof, the verification unit 332 verifies whether or not a prover of the proof is included in the revocation list. This makes it possible to avoid verification of a proof of a data user to whom the user does not desire to disclose personal information.

Incidentally, the effects described in the present specification are merely illustrative or exemplary and are not limiting. That is, the technology according to the present disclosure can achieve other effects that are obvious to those skilled in the art from the description of the present specification together with or in place of the above effects.

Note that the technology of the present disclosure can also have the following configurations as those belonging to the technical scope of the present disclosure.

(1)

An information processing device comprising:
  a first recording unit that records information regarding a browsing right of data in a blockchain in response to a request from an information management device that manages the data;
  a verification unit that verifies a zero-knowledge proof for proving that a user is a valid user who has been given the browsing right on a basis of the information regarding the browsing right written in the blockchain; and
  a second recording unit that records information regarding a verification result of the proof in the blockchain.

(2)

The information processing device according to (1),
  wherein the first recording unit records a hash value obtained by hashing the information regarding the browsing right in the blockchain by using secret information shared between a data requester who requests the data and the information management device.

(3)

The information processing device according to (1) or (2),
  wherein the second recording unit does not record information that associates the proof with the information regarding the browsing right when recording the information regarding the verification result of the proof in the blockchain.

(4)

The information processing device according to any one of (1) to (3),
  wherein the second recording unit updates the information regarding the browsing right and records the updated information in the blockchain each time the verification unit performs verification.

(5)

The information processing device according to (1), further comprising:
  an update unit that updates a revocation list recorded in the blockchain in response to a request from the information management device,
  wherein the verification unit verifies, prior to the verification of the proof, whether or not a prover of the proof is included in the revocation list.

(6)

An information processing method comprising the steps of:
  by a processor, recording information regarding a browsing right of data in a blockchain in response to a request from an information management device that manages the data;

verifying a zero-knowledge proof for proving that a user is a valid user who has been given the browsing right on a basis of the information regarding the browsing right written in the blockchain; and recording information regarding a verification result of the proof in the blockchain.

(7)

An information processing program for causing a processor to:

record information regarding a browsing right of data in a blockchain in response to a request from an information management device that manages the data;

verify a zero-knowledge proof for proving that a user is a valid user who has been given the browsing right on a basis of the information regarding the browsing right written in the blockchain; and record information regarding a verification result of the proof in the blockchain.

REFERENCE SIGNS LIST

1 INFORMATION PROCESSING SYSTEM
10 USER TERMINAL
20 SERVICE PROVIDING DEVICE
30 BC CLIENT DEVICE
31 COMMUNICATION UNIT
32 STORAGE UNIT
33 CONTROL UNIT
40 BC SYSTEM
50 DATA USER DEVICE
331 FIRST RECORDING UNIT
332 VERIFICATION UNIT
333 SECOND RECORDING UNIT
334 TRANSMISSION UNIT
335 UPDATE UNIT

The invention claimed is:

1. An information processing device, comprising:
a control circuit configured to:
record a hash value and information regarding a browsing right of data in a blockchain based on a request from an information management device that manages the data, wherein the hash value is obtained by a hashing process on the information regarding the browsing right with secret information shared between a data requester that requests the data and the information management device;
verify, based on the information regarding the browsing right written in the blockchain, a zero-knowledge proof to prove that a user is a valid user with the browsing right; and
record information regarding a verification result of the zero-knowledge proof in the blockchain, wherein the recorded information regarding the verification result excludes specific information that associates the zero-knowledge proof with the information regarding the browsing right.

2. The information processing device according to claim 1, wherein the control circuit is further configured to:
update the information regarding the browsing right; and
record the updated information in the blockchain.

3. The information processing device according to claim 1, wherein the control circuit is further configured to:
update, based on the request from the information management device, a revocation list recorded in the blockchain; and
verify, prior to the verification of the zero-knowledge proof, whether a prover of the zero-knowledge proof is included in the revocation list.

4. An information processing method, comprising:
recording a hash value and information regarding a browsing right of data in a blockchain based on a request from an information management device that manages the data, wherein the hash value is obtained by a hashing process on the information regarding the browsing right with secret information shared between a data requester that requests the data and the information management device;
verifying, based on the information regarding the browsing right written in the blockchain, a zero-knowledge proof for proving that a user is a valid user with the browsing right; and
recording information regarding a verification result of the zero-knowledge proof in the blockchain, wherein the recorded information regarding the verification result excludes specific information that associates the zero-knowledge proof with the information regarding the browsing right.

5. A non-transitory computer-readable medium having stored thereon, computer-executable instructions which, when executed by a computer, cause the computer to execute operations, the operations comprising:
recording a hash value and information regarding a browsing right of data in a blockchain based on a request from an information management device that manages the data, wherein the hash value is obtained by a hashing process on the information regarding the browsing right with secret information shared between a data requester that requests the data and the information management device;
verifying, based on the information regarding the browsing right written in the blockchain, a zero-knowledge proof for proving that a user is a valid user with the browsing right; and
recording information regarding a verification result of the zero-knowledge proof in the blockchain, wherein the recorded information regarding the verification result excludes specific information that associates the zero-knowledge proof with the information regarding the browsing right.

* * * * *